US007099654B1

(12) United States Patent
Tewfik (10) Patent No.: US 7,099,654 B1
(45) Date of Patent: Aug. 29, 2006

(54) HIGH SPEED WIRELESS SENSOR, SERVER AND STORAGE NETWORKS

(75) Inventor: Ahmed H. Tewfik, Edina, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 156 days.

(21) Appl. No.: 10/616,415

(22) Filed: Jul. 8, 2003

Related U.S. Application Data

(60) Provisional application No. 60/394,562, filed on Jul. 8, 2002.

(51) Int. Cl.
*H04M 1/66* (2006.01)
*H04M 1/68* (2006.01)
*H04M 3/16* (2006.01)
*H04Q 7/24* (2006.01)
*H04L 12/28* (2006.01)

(52) U.S. Cl. .............. 455/410; 370/338; 370/395.42; 375/132; 714/776

(58) Field of Classification Search ............... 370/432, 370/338, 395.742, 395.42; 455/410; 375/132; 714/776
See application file for complete search history.

(56) References Cited

U.S. PATENT DOCUMENTS

| 4,599,722 A * | 7/1986 | Mortimer .................. 714/776 |
| 6,400,751 B1* | 6/2002 | Rodgers .................. 375/132 |
| 2003/0161290 A1* | 8/2003 | Jesse et al. ............... 370/338 |
| 2004/0005872 A1* | 1/2004 | Cervinka et al. .......... 455/410 |
| 2005/0025159 A1* | 2/2005 | Lee et al. ............. 370/395.42 |

* cited by examiner

*Primary Examiner*—William D. Cumming
(74) *Attorney, Agent, or Firm*—Schwegman, Lundberg, Woessner & Kluth, P.A.

(57) ABSTRACT

Systems and methods implement a high speed wireless network. The systems and methods include using multiple channels of a wireless network interface to send and receive data simultaneously. Aspects of the system and methods include load balancing, error correction, and link aggregation over the multiple wireless channels.

1 Claim, 7 Drawing Sheets

HIGH SPEED WIRELESS SENSOR, SERVER AND STORAGE NETWORKS

RELATED FILES

This application claims the benefit of U.S. Provisional Application No. 60/394,562, filed Jul. 8, 2002, which is hereby incorporated herein by reference.

FIELD

The present invention relates generally to sensor, server and storage networks, and more particularly to high speed wireless implementations of such networks.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2002, Regents of the University of Minnesota, All Rights Reserved.

BACKGROUND

The computing landscape has also been changed by the increasing deployment of distributed computing and storage in scientific computing and enterprise information networks. Today's high performance scientific, load balancing and high availability clusters typically are comprised of heterogeneous collections of PCs and servers sharing hierarchical storage with caches, local and remote main memory, secondary and tertiary (for backups) storage configured as a storage area network (SAN). This distributed hardware configuration offers many benefits such as higher performance, scalability and resilience. While such configurations are cheaper to deploy than previously available supercomputing or RAID-based storage solutions, the cost of the Fiber Channel switches in the network fabric that ties the processors and storage puts them out of reach for many small enterprises and scientific research groups. Furthermore, larger clusters with several switches can be difficult to deploy, maintain and reconfigure.

The static nature of Fiber Channel topologies may also have a detrimental effect on system performance. Specifically, the mismatch between access times of secondary storage and processor speeds, coupled with widely different application I/O access patterns, adversely affect the performance of these systems. Researchers and designers have addressed these problems in the past by improving parallel I/O and storage and optimizing I/O requests. I/O optimization often produces dynamic connectivity requirements that depend on the tasks at hand. Static network topologies offer sub-optimal emulations of these changing connectivity patterns.

As a result, recent years have witnessed the emergence of wireless local area networks (WLANs). WLANs are convenient: they allow flexibility and roaming and support dynamic environments. Furthermore, they are easy to install. In some cases, e.g., older buildings, they may be cheaper to deploy: an entire network can be put together in a matter of hours rather than days with no need for wiring or rewiring.

Several studies have shown that in many scenarios, WLAN have a lower cost of ownership than their wired counterparts despite the potentially cheaper cost of wired LAN cards.

However, current wireless interfaces do not typically provide the same bandwidth as that available in their wired counterparts. In addition, studies have shown that TCP performance is severely degraded when the wireless link experiences high bit error rates, e.g., when the receiver and transmitter are distant. This degradation is mainly due to the fact that TCP assumes that congestion, rather than unreliable communication at the physical layer, causes packet losses and delays. The mechanisms used by TCP to handle congestion (e.g. reducing the TCP window size) result in a reduction of end-to-end throughput in wireless networks that can dramatically impact the utilization of the precious bandwidth available.

As a result, there is a need in the art for the present invention.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The following detailed description is, therefore, not to be taken in a limiting sense, and the scope of the present invention is defined only by the appended claims.

Figure 1A:
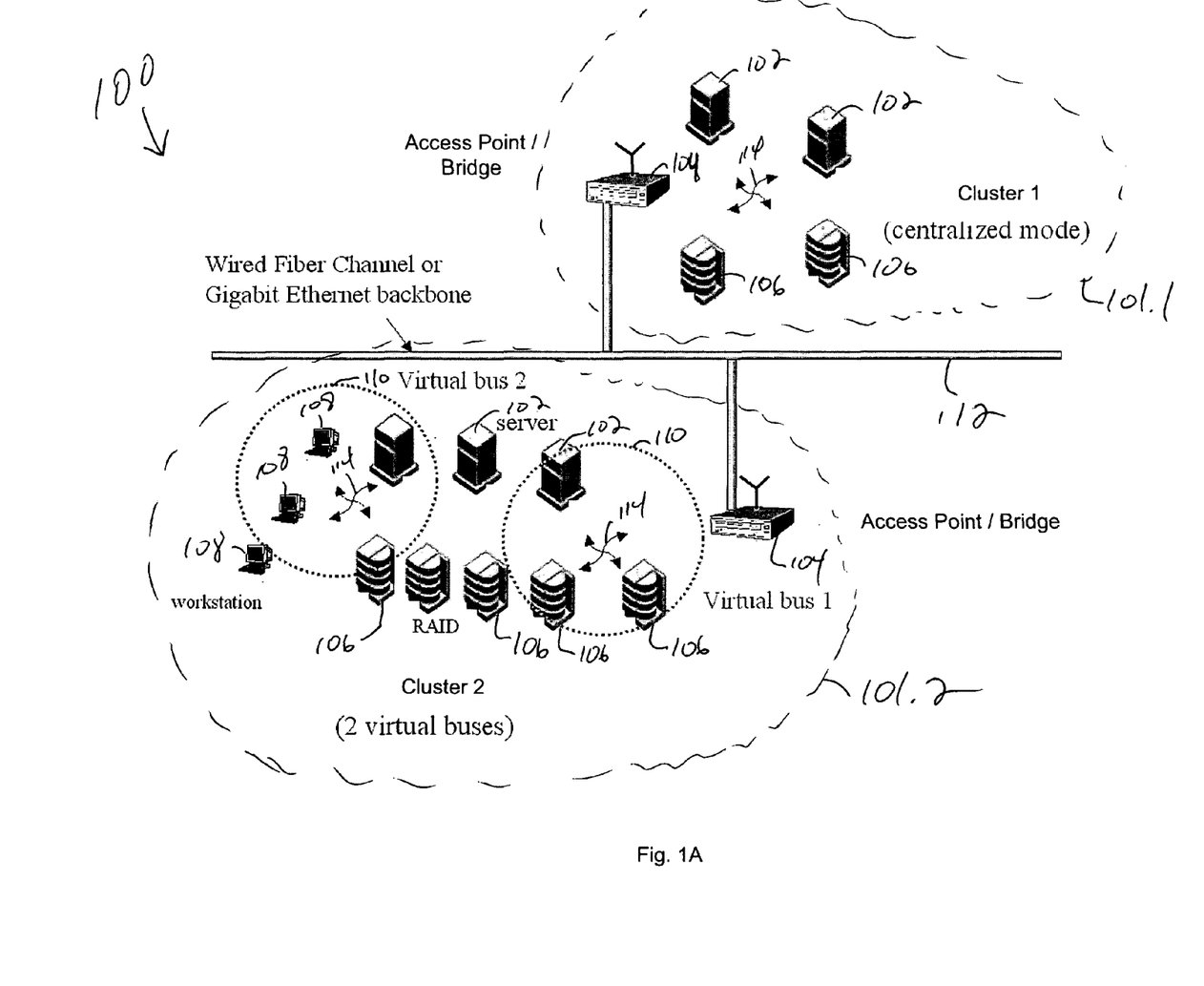
FIGS. 1A–1C are block diagrams illustrating network topologies in which embodiments of the invention may be practiced.

FIG. 1A is a block diagram illustrating an exemplary network topology in which embodiments of the invention may be practiced. In the exemplary topology, clusters 101.1 and 101.2 include access point 104, servers 102, RAID systems 106 and workstations 108. The cluster may be a load-balancing cluster, a high availability cluster or a sensor (e.g., camera), storage or server area network. These clusters typically include heterogeneous hardware and operating systems connected via a wireless network 114. For example a cluster may consist of desktop workstations 108 (such as Dell Dimension™ 8200), servers 102 (e.g., Sun Fire Midframe™ and Dell PowerEdge™ families of servers), workstations 108 (e.g., Sun Blade™ 100 workstation) and RAID storage arrays 106, such as the Sun StorEdge™ or Dell PowerVault™.

Access point 104 may be a convention wireless access point as is known in the art. In alternative embodiments, access point 104 may be a bridge that connects a wireless network 114 to a wired network such as network 112.

At the local level, clusters of processors and storage may be connected in wireless pico-cells. These pico-cells are then aggregated via a wired backbone 112, such as Fiber or Gigabit Ethernet backbone to connect the local clusters to other remote clusters. By combining wireless and Fiber or Gigabit Ethernet connectivity, this architecture can satisfy the requirements of a high performance cluster, including low cost, ease of reconfigurability (static and dynamic), high resiliency, high bandwidth, low latency and delivery time guarantees.

Furthermore, in some embodiments, the components may be arranged in a virtual bus 110. A virtual bus is a temporary inter-connect topology that allows an ad-hoc sub-set of nodes to share broadcast communications exclusively on a portion of the available bandwidth.

Wireless backplanes and protocol stacks in various embodiments of the invention support multirate communications and different classes of service. This allows the cluster to simultaneously execute applications, such as such as scientific code, online transaction processing (OLTP), mirroring and backups, that run at different time scales and have dissimilar I/O patterns and requirements.

Virtual buses in some embodiments may be used in shared memory programming models based on the inherent ability of a wireless network to broadcast all messages to all processors. This broadcast capability can provide a mechanism to develop an efficient snooping-based protocol for a wireless cluster computing system. These virtual buses may allow programmers to implement both update and invalidate coherence protocols.

Additionally, since they are virtual buses, the snooping group may be dynamically reconfigured as the sharing patterns of the program change. For instance, a separate channel may be assigned to each virtual bus. These separate channels may allow two or more separate groups of processors to be snooping on their own virtual buses without interfering with each other. This virtual bus mechanism can provide a performance improvement compared to traditional hard-wired bus-based snooping protocols in which all processors must always monitor all of the other processors' transactions, even if they have no shared data.

Figure 1B:
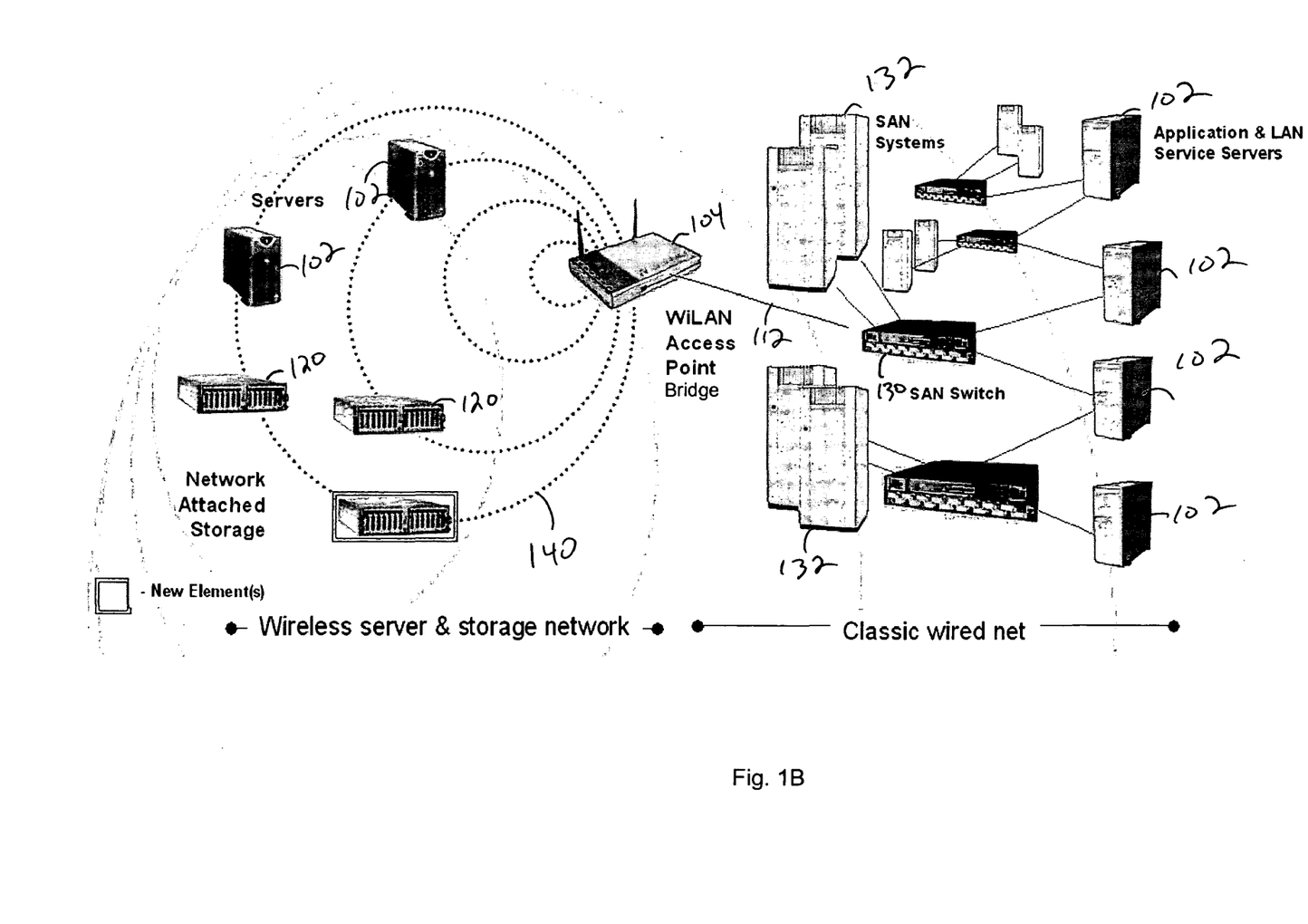

Other possible exemplary configurations of the components described above are shown in FIGS. 1B and 1C. FIG. 1B illustrates an exemplary topology including a SAN (Storage Area Network). SAN systems 132 are connected via a wired network 112 and to servers 102 through SAN switch 130. In addition servers 102 on wireless network 140 have access to network attached storage systems 120.

Figure 1C:
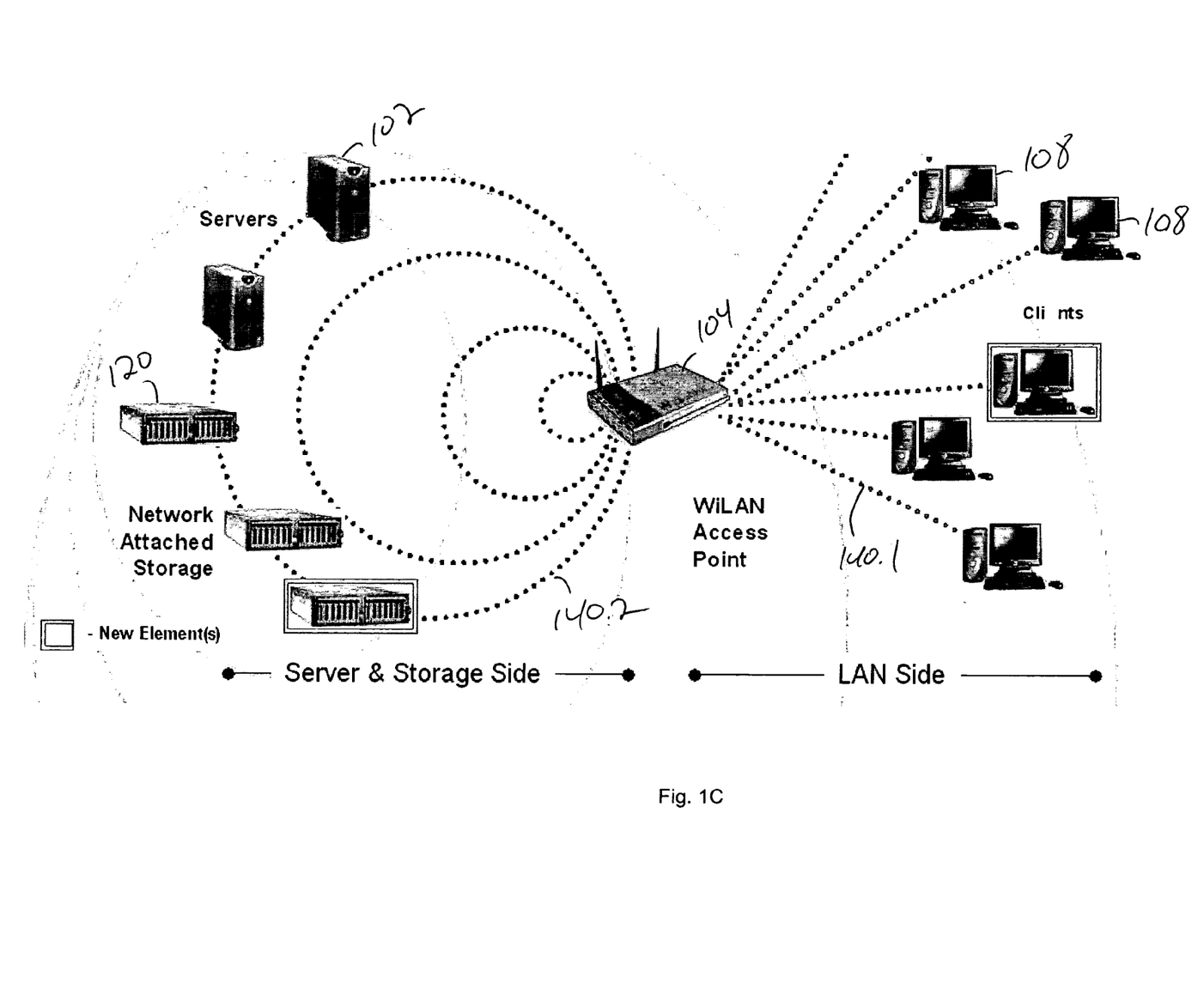

Note in particular that a high bit rate wireless server, sensor or storage network can co-exist with traditional WLANs as illustrated in FIG. 1C.

It is worth noting here that studies that have investigated the effect of distance between transmitters and receivers on WLAN performance, and in particular have shown that within a single room and at distances less than 10 m, higher than 99.1% throughputs and goodputs (percentage of error free packets) can be achieved. By controlling radiation and reception patterns and powers, the wireless bandwidth can be shared by a respectable number of processors and storage devices deployed in a small (e.g. less than 200 m$^{-2}$) area.

Figure 2:
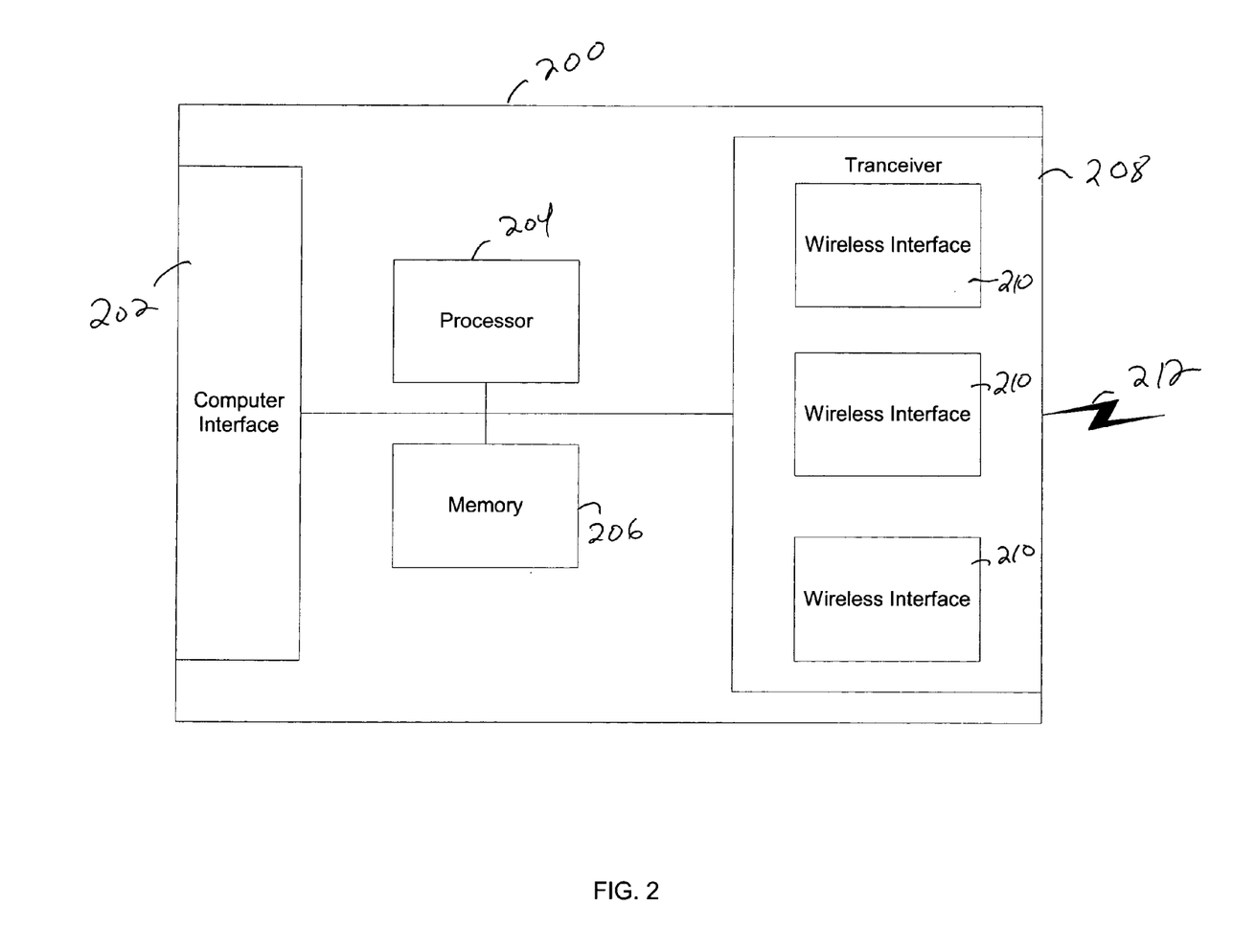
FIG. 2 is a block diagram providing illustrating a network interface card according to an embodiment of the invention.

FIG. 2 is a block diagram providing illustrating a network interface card 200 according to an embodiment of the invention. In some embodiments, network interface card 200 includes a computer interface 202, processor 204, memory 206, and wireless transceiver 208 capable of connecting to a wireless network 212.

In some embodiments, computer interface 202 is a Card-Bus interface as is know in the art. In alternative embodiments, a PC card interface may be used. However, a Card-Bus interface is desirable because a PC card interface typically supports no more than 20 Mb/s. However other computer interfaces for other types of busses and systems may be used instead of a CardBus interface.

In some embodiments, network interface card 200 uses multiple wireless channels simultaneously. In one embodiment, all 12 available 802.11a channels may be used simultaneously to provide more than 100 MB/s.

In some embodiments, processor 204 is a network processor that implements the MAC protocol, such as an IXP-1200, or a microprocessor running a real time operating system with networking capabilities, such as Wind River System's VxWorks.

Memory 206 may be any type of ROM, RAM, Flash Memory, CD-ROM, DVD-ROM, hard-disk or other memory that stores data and/or computer instructions for execution by processor 204. In addition, memory 206 may buffer network data from the computer interface and/or transceiver.

In some embodiments, transceiver 208 includes one or more wireless interface modules 210. In one embodiments, wireless interface module 210 is an 802.11a chip, such as the AR5000 chip from Atheros. In alternative embodiments, wireless interface module 210 may be an ASIC chip or multiple FPGAs may be used to implement the transceiver 208, including RF control, turbo coding, timing recovery and synchronization, waveform generation and detection. Note also that some of the commercial chips available offer much higher bit rates than the maximum 54 MB/s rate specified by the IEEE 802.11a standard. For example, the AR5000 chip from Atheros offers up to 72 Mb/s using a proprietary implementation of Turbo-coding.

Figure 3:
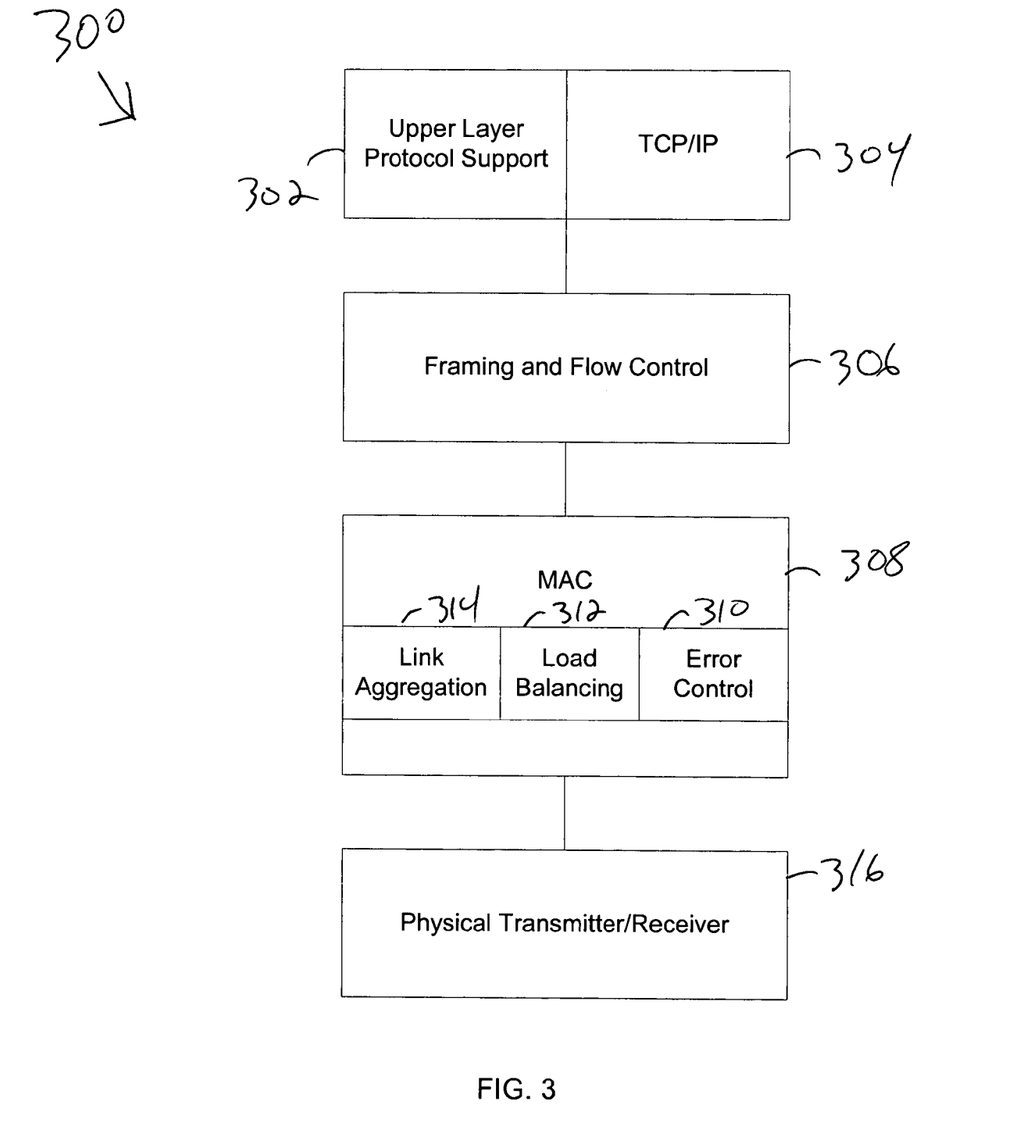
FIG. 3 is a block diagram illustrating a network protocol stack according to an embodiment of the invention.

FIG. 3 is a block diagram illustrating a network protocol stack 300 according to an embodiment of the invention. In some embodiments of the invention, network protocol stack 300 includes an upper layer protocol interface 302, framing and flow control layer 306, MAC (Media Access Control) layer 308 and physical layer 316.

Upper layer protocol interface typically provides transport level services to an application or operating system. In some embodiments of the invention upper layer protocol interface 302 encapsulates TCP/IP layer 304 protocol information. In alternative embodiments of the invention, the TCP/IP protocol information is stripped prior to forwarding data to the framing and flow control layer 306.

In some embodiments, framing and flow control layer 306 provides frame formatting, sequence management, exchange management, and flow control. Several credit based flow control mechanisms may be used in various embodiments, such as end-to-end credit or buffer-to-buffer credit flow control. A credit from a receiver to a sender indicates that the receiver can accept an additional frame. Flow control on the basis of credits may be useful to prevent losses and can mitigate the need to retransmit entire data sequences across a link. In some embodiments of the invention, the framing and flow control mechanisms of the Fibre Channel FC2 layer are utilized.

MAC layer 308 provides an interface between framing and flow control layer 306 and physical layer 316. In some embodiments of the invention, MAC layer 308 provides an IEEE 802.11 CSMA/CA interface that in some embodiments is enhanced with one or more of a link aggregation function 314, a load balancing function 312, and/or an error control function 310. Additionally in some embodiments, the MAC layer 308 uses the arbitration procedure used by Fiber Channel to the wireless link instead of the 802.11 multi access protocol.

Further, in some embodiments, MAC layer 308 uses a dynamic frame structure similar to that used by the IEEE802.15 MAC. Frames include two periods with a dynamically adjustable boundary. One period will support bursty traffic such as read/write requests while the other is dedicated to guaranteed information slots and uses prioritization to support multiple classes of latency.

The MAC interacts with the physical layer, requests for guaranteed service and I/O optimization routine to determine connections, allocate channels and slots to nodes according to their traffic types, latency and throughput. By taking the time scales and the differing nature of I/O requirements of different applications into account, the MAC can optimize short and long-term usage of the available bandwidth.

In some embodiments, MAC layer 308 supports parallel transmission of sequences over multiple channels. In these embodiments, link aggregation module 314 and load balancing module 312 may be used. Link aggregation module 314 maintains multiple wireless channels so that they appear as one logical link to upper layers such as framing and flow control layer 306. Link aggregation module 314 gathers packets arriving over different channels from the physical layer 316, and aggregates the data into appropriate frames. Further, link aggregation module 314 transmits data over multiple channels simultaneously to improve throughput. Table 1 below provides data regarding the channels available in differing wireless communications standards:

TABLE 1

Comparison of the IEEE 802.11 and 802.15.3 standards.

| | 802.11 b | 802.11 a | 802.15.3 |
|---|---|---|---|
| Frequency band | 2.4 GHz | 5 GHz | 2.4 GHz |
| Maximum bit rate per channel | 11 Mb/s | 54 Mb/s | 55 Mb/s |
| Number of non-interfering channels | 3 | 12 | 4 |

It should be noted that while most technology comparisons and discussions emphasize peak rate capabilities, spatial capacity measured in bits/sec/m$^2$ can be more useful. For example, three non-interfering 802.11b networks can operate simultaneously, providing a total transmission rate of 33 Mb/s. By limiting transmitter power, embodiments of the invention may achieve 105 Kb/s/m$^2$ in a 10 m circle. In the case of 802.11a, twelve non-interfering 802.11b networks can operate simultaneously, providing a total transmission rate of 648 Mb/s or 2 Mb/s/m$^2$ in a 10 m circle.

Load balancing module 312 operates to ensure that packets are distributed over the different channels in an efficient manner. Load balancing module 312 in some embodiments takes the channel throughput and delay into account when load balancing, so that volume, delay and/or throughput may be considered in load balancing decisions.

Error control module 310 provides error correction and control for packets arriving from the physical channel. In some embodiments of the inventions, packet encoding mechanisms are used that allow for error correction within a packet and across multiple packets. For example, one packet may have information enabling the error control module 310 to correct errors in previous or subsequent packets. Examples of such error control encodings include the use of convolutional coding, such as rate ⅔ coding or rate ½ convolutional coding, turbo-coding, and low density parity check codes as are known in the art.

As mentioned above, different data transfers in a wireless network occur at different time scales and have different guaranteed bandwidth needs. The MAC layer 308 in the embodiments described above takes these different traffic characteristics into account in allocating information slots. Additionally, MAC layer 308 in some embodiments may receive hints from software applications regarding how information slots are to be allocated.

It should be noted that not all physical layer support multirate transmissions. This support can be achieved using proposed extensions of IEEE 802.11a based on generalized hierarchical QAM or PSK constellations that allow transmissions at multiple rates to co-exist efficiently.

Additionally, it should be noted that I/O is usually a mix of reads and writes. However, some applications may involve one type of operations overwhelmingly. For example, the I/O activity of a video server will be close to 100% reads, while that of video editing cluster will be dominated by writes.

I/O may be random or sequential. E-mail and OLTP servers issue many concurrent random I/O calls (high request rate), reading or writing small pieces of data (typically less than 8 KB). Such applications benefit from acknowledgments of each transfer. Sequential I/O characterizes multimedia applications and decision support. Multimedia applications tend to access large blocks of data in a predictable manner. Unlike other applications, multimedia programs require a minimum transfer rate to guarantee the quality of the audio and video. Similarly, backup applications require a dedicated, sustained connection. Scientific programs may access data randomly or sequentially, in small pieces or large blocks. On the other hand, the I/O needs of many scientific programs occur in well-defined phases: a program will read data, process it and then write data. One should also note that while designers of OLTP and multimedia applications typically focus on I/O, scientific programmers tend to concentrate more on computational efficiency and numerical accuracy. Note however that past studies indicated that programmers are willing to change the access patterns of their codes to suit the I/O performance of their hardware. Table 2 illustrates the I/O profiles of several applications.

TABLE 2

Examples of I/O profiles

| APPLICATION | READ/WRITE MIX | TYPICAL ACCESS | TYPICAL I/O SIZE |
| --- | --- | --- | --- |
| OLTP, email, e-commerce | 80% read, 20% write | Random | 2 KB to 8 KB |
| Decision support, seismic | 80% read, 20% write | Sequential | 16 KB to 128 KB |
| Video server | 98% read, 2% write | Sequential | >64 KB |
| Serveless backup | Variable | Sequential | >64 KB |

Note that different types of interprocessor communications and secondary storage read/write requests can tolerate different levels of latencies. For example, synchronization operations should be performed as quickly as possible in order to minimize delays among cooperating processors. Other types of interprocessor communications, such as the transfer of an entire physical page, often can tolerate higher latencies. Similarly, data traffic will occur at different time scales. Read/write requests and synchronization messages occur at two short and very short time scales. Hard drive mirroring can be done at medium time scale, on the order of an hour or two. Backups can be done over a one-day time scale. The MAC layer described above may be used so support some or all of these I/O patterns in an efficient manner.

Figure 4:
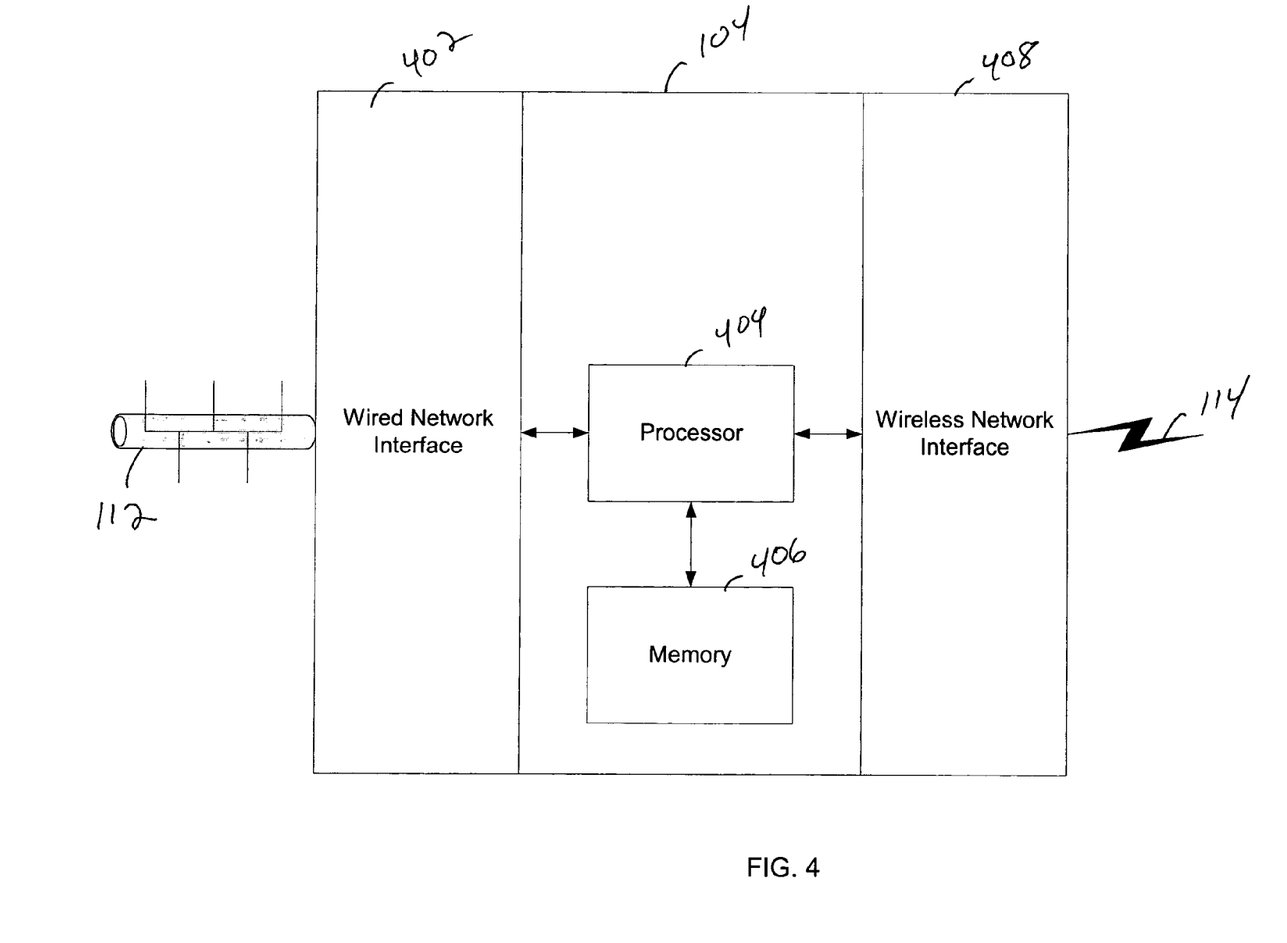
FIG. 4 is a block diagram of a bridge device according to an embodiment of the invention.

FIG. 4 is a block diagram of a bridge device 104 according to an embodiment of the invention. As mentioned above, clusters of wireless networks may be connected via Fiber Channel or Gigabit Ethernet. In some embodiments, nodes on a wireless network communicate only with the access point/bridge 104 and not directly between themselves. The access point/bridge 104 may also provides bridging between a wireless network and a wired network.

In some embodiments, bridge 104 includes wired network interface 402, processor 404, memory 406 and wireless network interface 408. In some embodiments, wired network interface 402 may be any interface capable of being communicably coupled to a wired network such as network 112.

Processor may be any type of processor capable of executing instructions from a memory such as memory 406 and is used in some embodiments to at least partially implement the protocol stack illustrated in FIG. 3. Memory 406 may be used to buffer data that arrives from or is sent to wired network interface 402 and wireless network interface 408.

In some embodiments, wireless network interface 408 implements at least a portion of the protocol stack illustrated above in FIG. 3.

In some embodiments, a splitting approach is used to perform bridging. A splitting approach is desirable, because it has the advantage of being easy to deploy as it does not affect other standard hardware or software that is under development or in deployment. In some embodiments, bridge 104 breaks any connection into two separate ones: the first between a wired node on network 112 and the bridge 104 between the wired and wireless links and the second between the bridge 104 and the wirelessly connected nodes on network 114. The second connection may use TCP/IP or modified protocols optimized for high bit rate wireless transmission over short distances as described above.

Figure 5A:
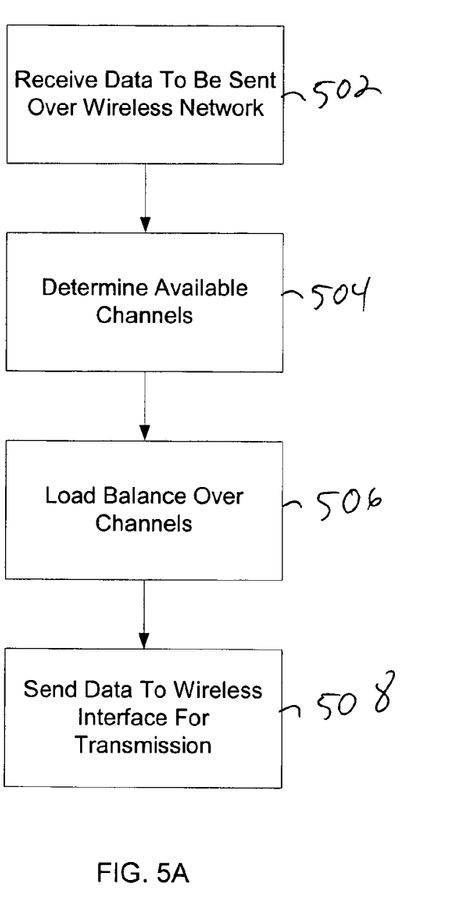
FIGS. 5A and 5B are flowcharts illustrating methods according to embodiments of the invention.
Figure 5B:
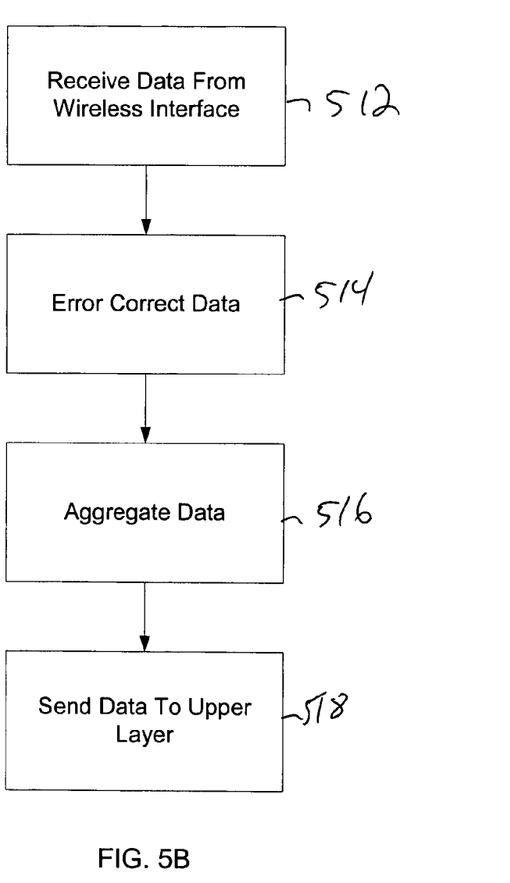

FIGS. 5A and 5B are flowcharts illustrating methods for sending and receiving data over wireless networks according to embodiments of the invention. The method to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media such as RAM, ROM, DVD-ROM, CD-ROM, hard drives, floppy drives, and signals over a wired or wireless network). The methods illustrated in FIGS. 5A and 5B are inclusive of the acts required to be taken by an operating environment executing an exemplary embodiment of the invention.

FIG. 5A illustrates a method for sending data over a wireless network. The method begins by receiving data to be sent (block 502). The data may be received from an upper layer protocol, and may be in a protocol data unit such as a frame or block.

Next, the method determines which channels of a wireless interface are available to transmit the data (block 504). The number of available channels may be limited to a number of factors. Some factors include the wireless protocol being used, whether channels have been reserved for special purposes (e.g. virtual busses). The available channels are then aggregated to form a logical link.

Next the method performs load balancing over the available channels (block 506). In some embodiments, load balancing may be either volume based, throughput based, or a combination of the two. Channels may have differing throughput rates because they are supporting different protocols, or because of multipath, interference, or other sources.

Next, the data is sent to the selected channels of the wireless interface for transmission (block 508).

FIG. 5B illustrates a method according to an embodiment of the invention for receiving network data from a wireless interface. The method begins when data is received from one or more channels of the wireless interface (block 514). The system then determines if any errors exist in the data, and if the errors can be corrected (block 514). Methods for error correction have been described above.

Next the method determines if the data is to be aggregated (block 516). Data will be aggregated over channels that belong to the same logical link.

Finally, the data is sent to an upper layer in a network stack (block 518). If the data was aggregated, the aggregated data is sent as a single protocol data unit such as a frame.

CONCLUSION

Systems and methods for providing high speed wireless networks have been disclosed. The systems and methods described provide advantages over previous systems. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include a variety of wireless network environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

We claim:

1. A method for receiving data from a wireless network, the method comprising:
   receiving a plurality of network data packets from a wireless network;
   determining if the plurality of network data packets include erroneous data, and if so correcting the erroneous data;
   aggregating the plurality of network data packets into a single protocol data unit; and
   providing the protocol data unit to a network layer.

* * * * *

UNITED STATES PATENT AND TRADEMARK OFFICE
CERTIFICATE OF CORRECTION

PATENT NO. : 7,099,654 B1
APPLICATION NO. : 10/616415
DATED : August 29, 2006
INVENTOR(S) : Tewfik It is certified that error appears in the above-identified patent and that said Letters Patent is hereby corrected as shown below:

On Sheet 3 of 7, in Fig. 1C (Below Reference Numeral 108), line 1, delete "Cli nts" and insert -- Clients --, therefor.

In column 2, line 13, after "e.g." insert -- , --.

In column 3, line 24, delete "load-balancing" and insert -- load balancing --, therefor.

In column 3, line 53–59, delete "Wireless backplanes and protocol stacks in various embodiments of the invention support multirate communications and different classes of service. This allows the cluster to simultaneously execute applications, such as such as scientific code, online transaction processing (OLTP), mirroring and backups, that run at different time scales and have dissimilar I/O patterns and requirements." and insert the same on line 52 after "available bandwidth." as continuation of the paragraph.

In column 3, line 56–57, before "scientific" delete "such as". (Second Occurrence)

In column 4, line 30, after "e.g." insert -- , --.

In column 4, line 30, delete "$m^{-2}$" and insert -- $m^2$ --, therefor.

In column 5, line 42, delete "IEEE802.15" and insert -- IEEE 802.15 --, therefor.

In column 6, line 5, delete "802.11 b" and insert --802.11b --, therefor.

In column 6, line 5, delete "802.11 a" and insert -- 802.11a --, therefor.

UNITED STATES PATENT AND TRADEMARK OFFICE
CERTIFICATE OF CORRECTION

PATENT NO.       : 7,099,654 B1
APPLICATION NO. : 10/616415
DATED            : August 29, 2006
INVENTOR(S)      : Tewfik It is certified that error appears in the above-identified patent and that said Letters Patent is hereby corrected as shown below:

In column 8, line 50, after "e.g." insert -- , --.

Signed and Sealed this

Sixth Day of March, 2007

JON W. DUDAS
*Director of the United States Patent and Trademark Office*